US011243519B2

(12) United States Patent
Gross et al.

(10) Patent No.: US 11,243,519 B2
(45) Date of Patent: Feb. 8, 2022

(54) METHOD FOR COMPUTER-AIDED PROCESSING OF STATE MESSAGES IN AN AUTOMATION INSTALLATION

(71) Applicant: SIEMENS AKTIENGESELLSCHAFT, Munich (DE)

(72) Inventors: Ralf Gross, Nuremberg (DE); Hans-Henning Klos, Weigendorf (DE); Benjamin Kohler, Nuremberg (DE); Wolfgang Riedl, Nuremberg (DE); Jens Schnittger, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 97 days.

(21) Appl. No.: 16/861,385

(22) Filed: Apr. 29, 2020

(65) Prior Publication Data

US 2020/0348656 A1    Nov. 5, 2020

(30) Foreign Application Priority Data

May 2, 2019    (EP) ..................................... 19172271

(51) Int. Cl.
    *G05B 19/41*    (2006.01)
    *G05B 19/418*   (2006.01)
    *G06F 17/18*    (2006.01)

(52) U.S. Cl.
    CPC ... *G05B 19/41875* (2013.01); *G05B 19/4183* (2013.01); *G06F 17/18* (2013.01)

(58) Field of Classification Search
    CPC .......... G05B 19/4183; G05B 19/41875; G06F 17/18
    See application file for complete search history.

(56) References Cited

U.S. PATENT DOCUMENTS

2002/0128799 A1    9/2002  Loecher
2004/0102997 A1*   5/2004  Kikuchi ............. G01N 35/0092
                                                        422/62
(Continued)

FOREIGN PATENT DOCUMENTS

DE    10161655    1/2003
EP     3454154    3/2019

OTHER PUBLICATIONS

EP Search Report dated Nov. 20, 2019 based on EP19172271 filed May 2, 2019.

*Primary Examiner* — Tuan C Dao
(74) *Attorney, Agent, or Firm* — Cozen O'Connor

(57) ABSTRACT

A method for computer-aided processing of state messages in an automation installation, wherein state messages are generated by components and detected with their generation points in time, where causative states present at the generation point of the state message or beforehand in other components are determined for a multiplicity of state messages of a respective component and the current state in the generated state message, where the propagation time between occurrence of the respective causative state and the generation point of the state message is calculated for each causative state, where groups are formed from the causative states, where in a respective group all causative states have at least the common feature that they were determined for the same current state in the respective component, and where at least one statistical parameter is determined from the propagation times which belong to the causative states of the same group and stored.

16 Claims, 3 Drawing Sheets

(56) References Cited

U.S. PATENT DOCUMENTS

| | | | |
|---|---|---|---|
| 2008/0187116 A1* | 8/2008 | Reeves | G01D 4/004 379/106.09 |
| 2009/0307660 A1* | 12/2009 | Srinivasan | G06F 8/314 717/114 |
| 2011/0016362 A1* | 1/2011 | Holzaepfel | H04L 43/0852 714/51 |
| 2019/0204179 A1* | 7/2019 | Du | H04L 41/06 |

* cited by examiner

METHOD FOR COMPUTER-AIDED PROCESSING OF STATE MESSAGES IN AN AUTOMATION INSTALLATION

BACKGROUND OF THE INVENTION

1. Field of the Invention

The invention relates to a method and a device for computer-aided processing of state messages in an automation installation.

2. Description of the Related Art

During the operation of automation installations, state messages are generally detected, which are often also referred to as alarm messages. These messages are generated whenever the state of a corresponding component in the automation installation changes. If a state change results in a state of the component that deviates from normal operation (e.g. stoppage of the component), then it is desirable to identify the cause of this state. Here, an erroneous state is often caused by propagation effects of errors in other components of the installation.

In order to find causes of malfunctions in components of an automation installation, a "root cause analysis" is generally performed. Such analyses can determine causes of erroneous states in the automation installation in an automated manner. Root cause analyses are generally known, but require time parameters for identifying propagation effects, which time parameters temporarily relate the states of the various components of the installation to one another.

Time parameters for a root cause analysis are conventionally determined in the context of manual time measurements. Here, actively determined operating states are brought about in the components of the installation and time periods between the occurrence of such operating states are measured. The manual detection of such time parameters is very laborious and cannot be performed during normal operation of the installation.

Alternatively, there is the possibility of deriving corresponding time parameters from the digital specification of the planned automation installation. This has the disadvantage that it is not possible to take account of when an analyzed installation deviates from the originally planned installation. Accordingly, relatively large systematic errors can occur in the determination of the time parameters.

SUMMARY OF THE INVENTION

It is an object of the invention to provide a method and a device for computer-aided processing of state messages in an automation installation that enable time parameters to be extracted automatically from data acquired during normal operation of the installation, which time parameters are subsequently processable in the context of a root cause analysis.

This and other objects and advantages are achieved in accordance with the invention by a device and method for the computer-aided processing of state messages in an automation installation, where the state messages are generated by a multiplicity of components during performance of an automated process in the automation installation and are detected together with their generation points in time.

The term component of the automation installation should be understood broadly here. In particular, the component can be a self-contained unit in the automation installation which interacts with other units. Nevertheless, components can also define smaller parts of the automation installation that interact with one another.

A state message of a respective component of the installation that is processed in the method in accordance with the invention is distinguished by the fact that the state message is generated upon a change from a preceding to a new state in the respective component and indicates the new state. In the method in accordance with the invention, a pattern description is provided for a respective component of at least one portion of the components and in particular of all the components of the automation installation, where the pattern description indicates for one or a plurality of states in the respective component in each case one or a plurality of causative states allocated to the corresponding state in the respective component. Here, each causative state belongs to a different component than the respective component. Furthermore, each causative state can be a cause of that state in the respective component to which the causative state is allocated.

In the context of the method in accordance with the invention, steps a) to c) described below are performed for the respective component. These steps can be performed at least in part or entirely during the performance of the automated process or else optionally after the performance thereof.

In step a) for a multiplicity of state messages generated by the respective component, based in each case on the pattern description for the current state in the generated state message those causative states allocated to the current state are determined that are present at the generation point in time of the state message in other components, provided that such states exist. Furthermore, those causative states allocated to the current state are determined from which a change was effected upon the last state change that occurred in another respective component before the generation point in time of the state message, provided that such causative states exist. Furthermore, the propagation time between the occurrence of the respective causative state and the generation point in time of the state message is calculated for each causative state found. This is possible because, together with the state messages, the generation point in time thereof is also detected.

In a step b) of the method in accordance with the invention, groups are formed from the causative states that were determined for the respective component in step a). A respective group is distinguished by the fact that within it all causative states have at least the common feature that they were determined for the same current state (from different state messages) in the respective component. Optionally, the causative states in the group can also have even further commonalities. By way of example, it is also possible for the states in a group only ever to be the same causative states.

In a step c), finally, from the propagation times that belong to the causative states of the same group, one or a plurality of statistical parameters is/are determined and stored. These parameters can subsequently be processed in a suitable manner in the context of a root cause analysis, where the root cause analysis is not part of the method in accordance with the invention.

The method in accordance with the invention is distinguished by the fact that by suitable grouping of causative states with corresponding propagation times, statistical parameters that can be provided for a root cause analysis are determined in a simple manner. Here, the state messages generated during normal operation are processed, without actively determined operating states having to be brought about. The statistical parameters furthermore originate from the real operation of the automation installation under consideration and are not derived from a digital installation specification.

The states of the respective component of the automation installation can be defined differently depending on the configuration of the method in accordance with the invention. In one preferred embodiment, the states comprise at least one of the following states: (i) a state indicating normal operation of the respective component of the automation installation, (ii) a state indicating that the respective component is not sufficiently supplied with material, (iii) a state indicating that a log jam is present at an output of the respective component and (iv) a state indicating that an internal error has occurred in the respective component.

In the method in accordance with the disclosed embodiments of the invention, the times between the occurrence of the respective causative state and the generation point in time of the corresponding state message are processed as propagation times. In one preferred embodiment, the time periods between the end of a causative state and the generation point in time of the corresponding state message are additionally processed as further propagation times. In order to achieve this, the following steps d) to f) are carried out.

In a step d), for a multiplicity of state messages generated by the respective component, in each case on the basis of the pattern description for the current state in the generated state message those causative states (if present) allocated to the current state are determined from which a change was effected upon the last state change that occurred in a respective other component before the generation point in time of the state message. Here, the further propagation time between the end of the respective causative state and the generation point in time of the state message is calculated for each causative state.

In a step e), further groups are formed from the causative states that were determined for the respective component in step d), where within a respective further group all causative states have at least the common feature that they were determined for the same current point in time (from different state messages) in the respective component. In contrast to the above groups, the further groups now are not defined for the propagation time between the occurrence of the respective causative state and the generation point in time of the state message, but rather for the further propagation time between the end of the respective causative state and the generation point in time of the state message.

In a step f), finally, from the further propagation times that belong to the causative states of the same further group, one or a plurality of statistical parameters is/are determined.

The statistical parameters mentioned above can be defined differently depending on the configuration of the in accordance with the disclosed embodiments of the invention. In one particularly preferred embodiment, the statistical parameter(s) comprise(s) the minimum value and the maximum value of the propagation times in the respective group, where the propagation times optionally can also represent the above-defined further propagation times in a respective further group. These parameters have a high conceptual significance with respect to possible error propagations in the automation installation. Alternatively or additionally, the statistical parameter(s) can also comprise the frequency distribution of the propagation times in the respective group, where the propagation times can optionally also represent the above-defined further propagation times in a respective further group.

In a further preferred embodiment, the statistical parameter(s) comprise(s) a first quantile value, in accordance with which the propagation times of a predetermined percentage proportion of the abovementioned frequency distribution lie below the first quantile value. Alternatively or additionally, the statistical parameter(s) can comprise a second quantile value, in accordance with which the propagation times of a predefined percentage proportion of the frequency distribution lie above the second quantile value. A probabilistic description of corresponding extreme values of the propagation times is achieved with the presently contemplated embodiment.

In a further embodiment of the method in accordance with the invention, the abovementioned frequency distribution is approximated with a gaussian distribution, where the mean value and the standard deviation of the gaussian distribution are determined as statistical parameters. Based on such a gaussian distribution, in a subsequent root cause analysis, it is possible to determine such causative states whose propagation times deviate greatly from the mean value of the gaussian distribution. Here, it is assumed that these states are "incorrect causative states" that are not a cause of the corresponding state in the respective component.

In a further embodiment, in step a) above and/or in step d) above only such causative states that precede the generation point in time of the corresponding state message by less than a predetermined time threshold are determined. In this way, it is possible to reduce the number of "incorrect causative states" found, i.e., of such states that are not a cause of the current state of the respective component.

In a further preferred embodiment, in which the method in accordance with the disclosed embodiments of the invention is performed during the performance of the automated process, up to a predefined point in time after the beginning of the automated process, the statistical parameter(s) determined in step c) and/or step f) is/are combined with statistical parameters that were determined previously for a different automated process of the automation installation, where the combination is stored. Preferably, the different automated process is a process by which the same or a similar product was processed or produced. The presently contemplated embodiment is based on the insight that at the beginning of the method, enough parameters for a root cause analysis are not yet present, and so recourse is had to earlier processes. In one preferred embodiment, the combination is a weighted sum of the corresponding statistical parameters. Preferably, the weighting of the previously determined statistical parameters in the combination decreases with increasing reduction of the temporal distance with respect to the predefined point in time.

In a further preferred embodiment, the temporal profile of state changes in the components of the automation installation, before carrying out step a) and/or d), is pre-processed. Here, states that conceal whether a state present before the last state change is still present in the corresponding component are removed from the temporal profile.

The method in accordance with the disclosed embodiments of the invention can be used for arbitrary automation installations, e.g., in the field of manufacturing automation or process automation. Preferably, the automation installation is an installation for producing and/or processing a product, in particular a filling and/or packaging installation.

Besides the above-described embodiments of the method, it is also an object of the invention to provide a device for computer-aided processing of state messages in an automation installation, where the device is configured to perform the method in accordance with the disclosed embodiments of the invention or at least one preferred embodiment of the method in accordance with the invention.

It is also an object of the invention furthermore to a provide computer program product (i.e., a non-transitory computer-readable medium) comprising program code stored on a machine-readable carrier for implementing the method according in accordance with the disclosed embodiments of the invention or at least one preferred embodiment of the method in accordance with to the invention when the program code is executed on a computer.

It is a further object of the invention to a provide a computer program comprising program code for implementing the method in accordance with the disclosed embodiments of the invention or at least one preferred embodiment of the method in accordance with the invention when the program code is executed on a computer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is described in detail below with reference to the accompanying figures, in which.

DETAILED DESCRIPTION OF THE EXEMPLARY EMBODIMENTS

One embodiment of the method in accordance with the invention is explained below based on an automation installation in the form of a filling installation. An automated process for filling bottles with liquid is performed by the filling installation. Nevertheless, the invention is also usable for any other automation installations that implement a process in an automated manner. By way of example, the invention can also be employed in packaging installations or other installations for producing and/or processing a product.

One aim of the below-described method is to determine, in the context of the performance of the automated process, statistical time parameters in association with the propagation of states between components of the installation, without having to bring about actively determined operating states in the installation. The components in the installation can be defined variously, here. In particular, an individual component can constitute an entire unit in the installation. Likewise, it is possible for the components to be smaller parts of corresponding units. The statistical parameters determined can be processed in a root cause analysis in a suitable manner to analyze the interaction between components in the installation when abnormal operating states occur. The root cause analysis is not part of the method in accordance with the invention. Rather, the method in accordance with the invention provides suitable statistical parameters that can be processed in the context of a root cause analysis.

Figure 1:
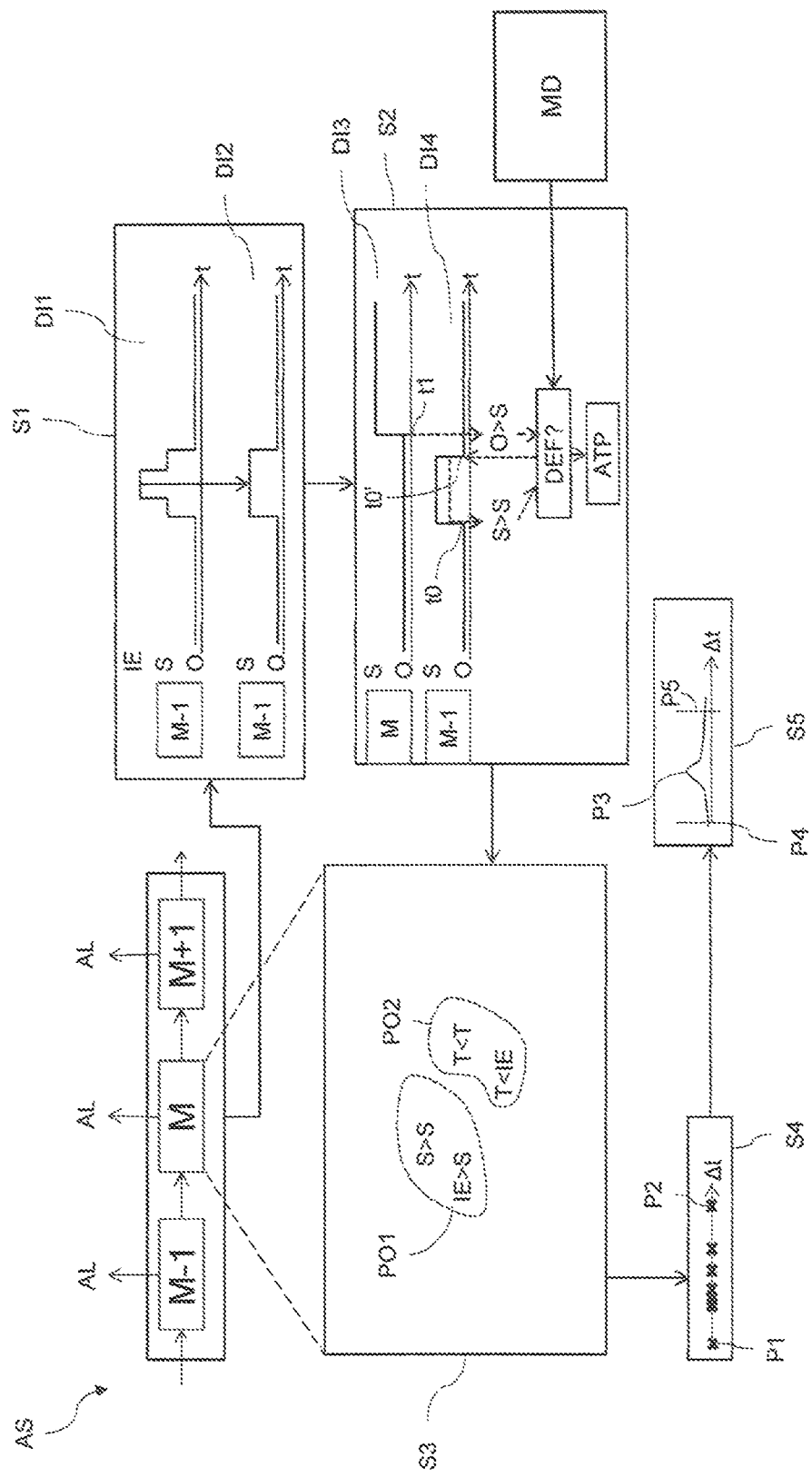
FIG. 1 shows a schematic illustration of the sequence of one embodiment of the method according to the invention.

The starting point of the method described here is an automation installation, designated by reference sign AS in FIG. 1. Three components of the automation installation are shown merely as excerpts, i.e, the component M−1, the component M and the component M+1. The arrows between the components represent the material flow direction, in the present disclosure the transport of the bottles to be filled through the filling installation. For the installation AS there exists a digital structural installation description defining the logical arrangement and also connections between the components in the installation taking account of the material flow direction during normal operation. The structural installation description can be derived from the planning documents of the automation installation, for example.

In the context of the performance of the automated process intended for the automation installation AS, statistical parameters are determined for example for each individual component. The method for determining these statistical parameters is explained below with reference to the installation component M illustrated. During the performance of the automated process, the individual components generate "alarm messages" AL. These alarm messages AL correspond to state messages within the meaning of the scope of the claims and are generated whenever the state in a component of the automation installation changes. The alarm messages AL are stored together with their generation points in time in order subsequently to derive the statistical parameters therefrom.

Consideration is given to the following states in the automation installation: (i) the state O, corresponding to a normal operating state of the corresponding component, (ii) the state "Starvation" (S), describing a stoppage of the corresponding component owing to lack of material supply in the material flow, (iii) the state "Tailback" (T), representing a log jam at an output of the corresponding components in the material flow and (iv) the state "Internal Error" (IE), caused by an internal error in the corresponding component.

In the presently described embodiment, a "pattern description" MD furthermore exists for each individual installation component, where the pattern description MD was created based on prior knowledge about the automated process performed and is processed in the context of the method described, here. In this case, the creation of corresponding pattern descriptions is not part of the method according to the invention; rather, the pattern descriptions were determined beforehand and constitute input parameters of the method. The pattern description indicates for the component M under consideration here the possible cause of a respective state of said component. For the component M, the pattern description MD is given by Table 1.

TABLE 1

| Cause | Effect |
| --- | --- |
| Internal Error (M − 1) | Starvation (M) |
| Starvation (M − 1) | Starvation (M) |
| Internal Error (M + 1) | Tailback (M) |
| Tailback (M + 1) | Tailback (M |

As is evident from Table 1, a lack of material supply (Starvation) in the component M can be caused either by an internal error I in the component M−1 or by a lack of material supply in the component M−1. A log jam (Tailback) in the component M can be caused by an internal error in the component M+1 or by a log jam in the component M+1.

Before the pattern description MD is processed in the method in FIG. 1, firstly a pre-processing of the time profile of the state changes that have occurred in the individual components occurs. This pre-processing is performed in step S1 and serves to filter out from the time profile states that mask other states already present beforehand and thus hide the actual cause of states in other components. This pre-processing is indicated by way of example with reference to the component M 1 in FIG. 1. The diagram DI1 shows the original time profile of a state change. Herer, time t is indicated along the abscissa and the states O (Normal operation), S (Starvation) and IE (Internal Error) are indicated along the ordinate. As is evident, firstly a change is made from the normal operating state O to the state Starvation S. While this state is present, the state of an internal error IE additionally occurs. The state S still exists. As a result, the state IE hides the state S. Accordingly, in accordance with step S1, the state IE is filtered out, which results in the corrected time profile in accordance with the diagram DI2. In accordance with this time profile, the state IE was removed, such that it becomes clear that the state S was present during the entire period of time between the change from the state O and the change back to the state O.

Based on the corrected time profiles, subsequently in step S2 the states of the alarm messages that have occurred in the component M are assigned to causative states via the pattern description MD. FIG. 1 shows by way of example a scenario in which the component M changed from the normal operating state O to the operating state S of a lack of material supply at the point in time t1 (diagram DI3). The corresponding alarm message with the generation point in time of this state change was detected.

The state that the component M−1 was in at the point in time t1 is subsequently determined. As is evident from diagram DI4, the component M−1 is in the normal operating state O at the point in time t1. The next step involves checking whether the pattern description MD defines a pattern for which the operating state O of the component M−1 is the cause of the operating state S of the component M. This is represented by the step "DEF?". The pattern just mentioned is specified by the notation O>S in FIG. 1. This notation generally applies to corresponding patterns in the form of rows in Table 1, where within the notation the arrow in accordance with the >1<always points from the cause toward the effect. Furthermore, a state that represents a cause and is to the left of the state of the effect (i.e. the state M) in the notation refers to the component M−1, whereas a state which represents a cause and is to the right of the state of the effect in the notation refers to the component M+1.

In accordance with the scenario in FIG. 1, the result arrived at is that the pattern O>S is not contained in the pattern description MD. The next step involves searching for that state of the component M−1 from which a change was effected last. This is the state S in accordance with diagram DI4. This state was ended at the point in time t0', whereas a change was effected to this state at the point in time t0. For the state S, the pattern description MD is then once again searched to establish whether this state can be the cause of the state S at the point in time t1 in the component M, i.e., whether the pattern S>S exists in the table above. Since this is the case (second row after the column designation in the table above), this pattern is assigned to a corresponding pool or corresponding group, as is indicated by the reference sign ATP (ATP=Add To Pool).

A plurality of pools of patterns are formed in this way. Here, a pool is distinguished by the fact that all effects of the corresponding pattern represent the same state of the component M. For a respective pattern added to a pool, the propagation time between the occurrence of the state of the cause and the occurrence of the state of the effect is furthermore detected, i.e., the time $\Delta t = t1 \ldots t0$ is determined. There thus exist a plurality of pools with corresponding patterns and propagation times contained therein, which represent the propagation of the causative states to the states effected. In the presently described embodiment, the points in time t0' at which a causative state was left again are not processed. In an optional embodiment of the invention, however, for such causative states that were ended before the occurrence of the state effected, it is also possible to detect the propagation times between the end of the causative state and the occurrence of the state effected (i.e. t1−t0') as further propagation times and to form corresponding pools with these further propagation times.

The formation of the pools described above is indicated by way of example in step S3 in FIG. 1. In this case, there exist only pools for such patterns which are actually contained in the pattern description MD in accordance with the table above. As is evident, there exists a pool PO1 for effected states S which can be caused by states in the component M−1 (the first two rows after the column designation in Table 1). Furthermore, there exists a pool PO2 for states T that can be caused by states in the component M+1 (third and fourth rows after the column designation in Table 1).

For each pool, the propagation times $\Delta t$ of the individual patterns contained therein are then subjected to a statistical analysis. A simple embodiment of this statistical analysis is indicated by step S4. In accordance with this step, the minimum value P1 and the maximum value P2 of the propagation times $\Delta t$ in each pool are determined as statistical parameters. These extreme values are important variables that can be processed in the context of a root cause analysis.

Furthermore, even further statistical parameters can also be extracted from the corresponding propagation times of a respective pool, which is indicated by the step S5 in FIG. 1. This step involves determining the frequency distribution of the propagation times $\Delta t$ in the corresponding pool as a further statistical parameter P3. Furthermore, extreme values of the frequency distribution are estimated via quantiles in a suitable manner. The value of corresponding quantiles is given by the two parameters P4 and P5 in FIG. 1. A percentage proportion is assigned to each quantile value P4 and P5. In this case, the quantile value P4 indicates that the propagation times of the assigned percentage portion of the frequency distribution P3 lie below the quantile value P4. By contrast, the quantile value P5 indicates that the propagation times of the assigned percentage proportion of the frequency distribution are greater than the quantile value P5. The percentage proportions can be suitably defined depending on the configuration of the method in accordance with the disclosed embodiments of the invention and enable a probabilistic description of corresponding extreme values of the propagation times.

An embodiment of the invention has been described above with reference to a process with an unambiguous relationship between the components based on the material flow. Nevertheless, the method can also be employed for processes in such automation installations in which branchings toward a plurality of different components proceeding from one component can occur.

In this case, under certain circumstances, the problem can occur that for an effected state a plurality of possible causes are found in the form of a plurality of patterns that occurred in the corresponding pattern description. Here, mechanisms should be provided that result in the fewest possible incorrect states that are not the cause of the effected state being found, or which make it possible to recognize incorrect patterns. This can be achieved, for example, by predefining a maximum time horizon for the search for causative states, i.e., a search is made for causative states only for a predefined time period back into the past proceeding from an alarm message that occurred. The proportion of incorrect patterns with no causal relationship to the current alarm message can thereby be reduced.

In a further embodiment, the frequency distribution P3 determined is furthermore approximated with a gaussian distribution. The parameters of the gaussian distribution in the form of mean value and standard deviation are stored. Her, it is assumed patterns that actually represent a causal relationship follow a gaussian distribution and become grouped around the mean value of the gaussian distribution. As such, incorrect patterns can then be identified in the context of the downstream root cause analysis by virtue of their deviating from the mean value of the approximated gaussian distribution beyond a predetermined extent.

Figure 2:
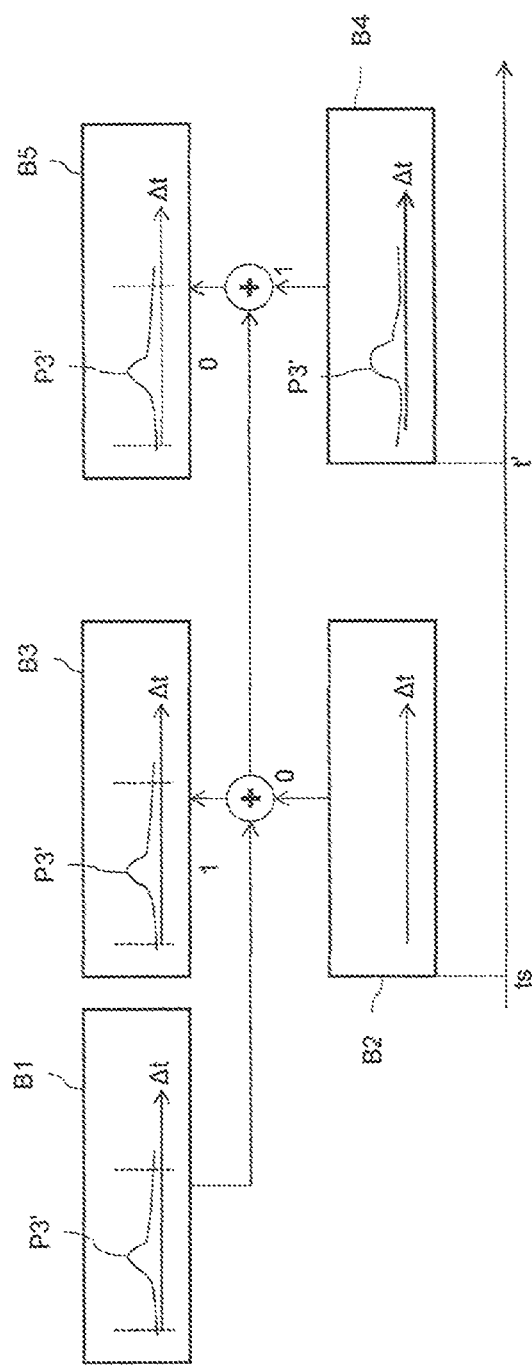
FIG. 2 shows a schematic illustration of an optional augmentation that can be employed in the method in FIG. 1.

FIG. 2 shows an optional augmentation of the method from FIG. 1. This augmentation takes into account the fact that at the beginning of the performance of the automated process at the point in time is there are as yet no alarm messages present that can be suitably utilized for the extraction of statistical parameters. Accordingly, the embodiment in FIG. 2 takes into account an earlier process that was performed by the automation installation AS. This is preferably a process that corresponds to the process started at the point in time ts or via which a similar product was processed. By way of example, in the case of a filling installation, this can be a process that involved filling bottles having a size that is comparable with the size of the bottles that are filled in the process started at the point in time ts.

In accordance with FIG. 2, with respect to the earlier process corresponding statistical parameters already exist, where the frequency distribution P3' is indicated by way of example as a statistical parameter (see FIG. 2 block B1). As is evident from block B2, statistical parameters for the process currently started do not yet exist at the point in time ts. Accordingly, at the beginning of the performance of the process, the statistical parameters P3' of the earlier process are processed by a corresponding root cause analysis (see block B3). This is indicated by a corresponding weighting in FIG. 2, where the weight of the earlier process has the value 1 and the weight of the current process has the value 0.

As the performance time of the current process increases, there are more and more alarm messages, resulting in a corresponding frequency distribution P3. Accordingly, a weighted combination of the corresponding histograms P3 and P3' is performed up to a predefined point in time t', where the weighting of the histogram P3' decreases continuously from the value 1 until the point in time t' since there are more and more histograms for the process currently being performed. Starting from the point in time t', only histograms P3 of the process currently being performed are taken into account and the weight of the histogram P3' for the earlier process is set to 0. This is indicated by the blocks B4 and B5 and corresponding weighting factors at the blocks in FIG. 2.

The above-described embodiment of the invention has a number of advantages. In particular, statistical time parameters can be determined from a normal operating process of an automation installation in a suitable manner, which parameters can subsequently be processed in the context of a root cause analysis. Here, it is not necessary to perform manual time measurements and to set specific operating states in the automation installation in a dedicated manner. Rather, the method can be performed during ongoing operation of the installation without adaptations to the installation. In this case, all state changes that occur during operation of the installation can be subjected to an analysis for determining time parameters. The statistical time parameters are furthermore determined exclusively based on real data of the operation of the installation and are not calculated from the installation specification. Accordingly, data of installations that deviate from the original installation specification can also be processed.

In one specific embodiment, it is also possible to process higher-order time parameters, i.e., to determine the propagation behavior not only in the direct vicinity of a component, but also across a plurality of components. Here, it is merely necessary for the above-described pattern description to be suitably extended by further causative states for a respective effected state of the component under consideration.

Figure 3:
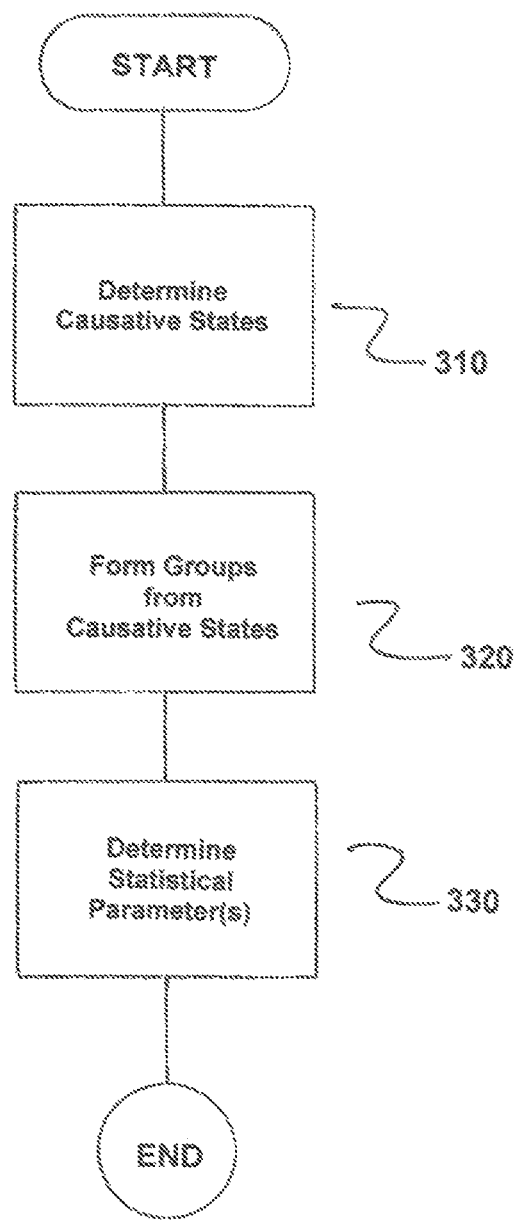
FIG. 3 is a flowchart of the method in accordance with the invention.

FIG. 3 is a flowchart of the method for computer-aided processing of state messages AL in an automation installation AS, where the state messages AL are generated by a multiplicity of components M 1, M, M+1 during performance of an automated process in the automation installation AS and are detected with their generation points in time t0, t1, where a state message AL is generated by a respective component M 1, M, M+1 upon a change from a preceding to a new state O, S, T, IE and indicates the new state O, S, T, IE, a pattern description MD is provided for a respective component M of at least one portion of components M 1, M, M+1 of the automation installation AS, said pattern description indicating for at least one state O, S, T, IE in the respective component M in at least one causative state O, S, T, IE each allocated to a corresponding state O, S, T, IE in the respective component M. In addition, each causative state O, S, T, IE belongs to a different component M 1, M+1 than the respective component M and can be a cause of that state O, S, T, IE in the respective component M to which the causative state O, S, T, IE is allocated.

For the respective component M, the method comprises determining each causative state O, S, T, IE allocated to a current state O, S, T, IE which is present at a generation point in time of the state message AL in other components M 1, M+1 for a multiplicity of state messages AL generated by the respective component M, based on the pattern description MD for the current state O, S, T, IE in the generated state message AL, and determining those causative states O, S, T, IE allocated to the current state O, S, T, IE from which a change was effected upon a last state change which occurred in a respective other component M 1, M+1 before the generation point in time of the state message AL, as indicated in step 310. In accordance with the invention, a propagation time Δt between an occurrence of a respective causative state O, S, T, IE and the generation point in time of the state message AL is calculated for each causative state O, S, T, IE.

Next, groups P01, P02 are formed from the causative states O, S, T, IE that were determined for the respective component M in step 310, as indicated in step 320. Here, all causative states O, S, T, IE in a respective group have at least a common feature that the causative states O, S, T, IE determined for the same current state O, S, T, IE in the respective component.

Next, at least one statistical parameter P1, P2, . . . , P5 is determined from the propagation times Δt which belong to the causative states O, S, T, IE of the same group P01, P02 and storing said determined at least one statistical parameter P1, P2, . . . , P5, as indicated in step 330.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for computer-aided processing of state messages in an automation installation, the state messages being generated by a multiplicity of components during performance of an automated process in the automation installation and being detected with their generation points in time, a state message being generated by a respective component upon a change from a preceding to a new state and indicating the new state, a pattern description being provided for a respective component of at least one portion of components of the automation installation, said pattern description indicating for at least one state in the respective component in at least one causative state each allocated to a corresponding state in the respective component, each causative state belonging to a different component than the respective component and can be a cause of that state in the respective component to which the causative state is allocated, the method for the respective component comprising:
   a) determining each causative state allocated to a current state which is present at a generation point in time of the state message in other components for a multiplicity of state messages generated by the respective component, based on the pattern description for the current state in the generated state message, and determining those causative states allocated to the current state from which a change was effected upon a last state change which occurred in a respective other component before the generation point in time of the state message, a propagation time between an occurrence of a respective causative state and the generation point in time of the state message being calculated for each causative state;
   b) forming groups from the causative states which were determined for the respective component in step a), in a respective group all causative states having at least a common feature which said causative states determined for the same current state in the respective component; and
   c) determining at least one statistical parameter from the propagation times which belong to the causative states of the same group and storing said determined at least one statistical parameter.

2. The method as claimed in claim 1, further comprising for the respective component:
   d) determining each causative state allocated to the current state from which a change was effected upon the last state change which occurred in another respective component before the generation point in time of the state message for a plurality of state messages generated by the respective component, based on the pattern description for the current state in the generated state message, the further propagation time between an end of the respective causative state and the generation point in time of the state message being calculated for each causative state;
   e) forming further groups from the causative states which were determined for the respective component in step d), in a respective further group all causative states having at least a common feature that said causative states were determined for the same current state in the respective component; and
   f) determining at least one statistical parameter from the further propagation times which belong to the causative states of the same further group.

3. The method as claimed in claim 1, wherein the at least one statistical parameter comprises a minimum value and a maximum value of the propagation times in a respective group.

4. The method as claimed in claim 2, wherein the at least one statistical parameter comprises a minimum value and a maximum value of the propagation times in a respective group.

5. The method as claimed in claim 1, wherein the at least one statistical parameter comprises a frequency distribution of the propagation times in a respective group.

6. The method as claimed in claim 5, wherein at least one of (i) the at least one statistical parameter comprises a first quantile value, in accordance with which the propagation times of a predetermined percentage proportion of the frequency distribution lie below a first quantile value and (ii) the at least one statistical parameter comprises a second quantile value, in accordance with which the propagation times of a predefined percentage proportion of the frequency distribution lie above a second quantile value.

7. The method as claimed in claim 5, wherein the frequency distribution is approximated with a gaussian distribution and a mean value and a standard deviation of the gaussian distribution are determined as statistical parameters.

8. The method as claimed in claim 6, wherein the frequency distribution is approximated with a gaussian distribution and a mean value and a standard deviation of the gaussian distribution are determined as statistical parameters.

9. The method as claimed in claim 1, wherein during at least one of step a) and step d) only such causative states are determined which precede the generation point in time of the state message by less than a predetermined time threshold.

10. The method as claimed in claim 1, wherein up to a predefined point in time after a beginning of an automated process, the at least one statistical parameter determined in at least one of step c) and step f) is combined with statistical parameters which were previously determined for a different automated process of the automation installation;
   wherein the combination of the at least one statistical parameter determined in at least one of said step c) and step f) and statistical parameters which were previously determined for the different automated process of the automation installation is stored; and wherein the combination of the at least one statistical parameter determined in at least one of said step c) and step f) and statistical parameters which were previously determined for the different automated process of the automation installation comprises a weighted sum and a weighting of the previously determined statistical parameters in the combination of the at least one statistical parameter determined in at least one of said step c) and step f) and statistical parameters which were previously determined for the different automated process of the automation installation decreases with increasing reduction of a temporal distance with respect to the predefined point in time.

11. The method as claimed in claim 1, wherein a temporal profile of state changes in the components of the automation installation, before performing at least one of step a) and d), is pre-processed such that states which conceal whether a state present before a last state change is still present in a corresponding component are removed from the temporal profile.

12. The method as claimed in claim 1, wherein the automation installation is an installation for at least one of producing a product and processing the product.

13. The method as claimed in claim 1, wherein the installation for at least one of producing a product and processing the product comprises at least one of a filling and packaging installation.

14. A device for computer-aided processing of state messages in an automation installation, comprising:
a processor including memory;
wherein the state messages are generated by a plurality of components during performance of an automated process in the automation installation and are detected with generation points in time of the state messages;
wherein a state message is generated by a respective component upon a change from a preceding state to a new state and indicates the new state;
wherein a pattern description is provided for a respective component of at least one portion of the components of the automation installation, each pattern description indicating for at least one state in a respective component at least one causative state allocated to a corresponding state in the respective component;
wherein each causative state belongs to a different component than the respective component and can be a cause of that state in the respective component to which the causative state is allocated;
wherein the device is configured to perform a method in which for the respective component:
a) for each state messages plurality of state messages generated by the respective component, based on the pattern description for the current state in the generated state message, those causative states allocated to the current state which are present at the generation point in time of the state message in other components are determined, and those causative states allocated to the current state are also determined from which a change was effected upon a last state change which occurred in another respective component before the generation point in time of the state message, the propagation time between the occurrence of the respective causative state and the generation point in time of the state message being calculated for each causative state;
b) groups are formed from the causative states which were determined for the respective component in step a), wherein in a respective group all causative states have at least the common feature that they were determined for the same current state in the respective component;
c) from the propagation times which belong to the causative states of the same group, at least one statistical parameters is determined and stored.

15. The device as claimed in claim 14, wherein the device is further configured to perform the method in which for the respective component:
d) each causative state allocated to the current state from which a change was effected upon the last state change which occurred in another respective component before the generation point in time of the state message for a plurality of state messages generated by the respective component is determined, based on the pattern description for the current state in the generated state message, the further propagation time between an end of the respective causative state and the generation point in time of the state message being calculated for each causative state;
e) further groups from the causative states which were determined for the respective component in step d) are formed, in a respective further group all causative states having at least a common feature that said causative states were determined for the same current state in the respective component; and
f) at least one statistical parameter from the further propagation times which belong to the causative states of the same further group is formed.

16. A non-transitory computer-readable medium encoded with a computer program which, when executed by a processor of a computer, causes computer-aided processing of state messages in an automation installation, the state messages being generated by a multiplicity of components during performance of an automated process in the automation installation and being detected with their generation points in time, a state message being generated by a respective component upon a change from a preceding to a new state and indicating the new state, a pattern description being provided for a respective component of at least one portion of components of the automation installation, said pattern description indicating for at least one state in the respective component in at least one causative state each allocated to a corresponding state in the respective component, each causative state belonging to a different component than the respective component and can be a cause of that state in the respective component to which the causative state is allocated, for the respective component the computer program comprising:
a) program code for determining each causative state allocated to a current state which is present at a generation point in time of the state message in other components for a multiplicity of state messages generated by the respective component, based on the pattern description for the current state in the generated state message, and determining those causative states allocated to the current state from which a change was effected upon a last state change which occurred in a respective other component before the generation point in time of the state message, a propagation time between an occurrence of a respective causative state and the generation point in time of the state message is calculated for each causative state;
b) program code for forming groups from the causative states which were determined for the respective component in step a), in a respective group all causative states having at least a common feature which said causative states determined for the same current state in the respective component; and c) program code for determining at least one statistical parameter from the propagation times which belong to the causative states of the same group and storing said determined at least one statistical parameter.

\* \* \* \* \*